United States Patent [19]

Stringfield et al.

[11] Patent Number: 4,950,332

[45] Date of Patent: Aug. 21, 1990

[54] PROCESS FOR DECOLORIZING AQUEOUS SUGAR SOLUTIONS VIA ADSORBENT RESINS, AND DESORPTION OF COLOR BODIES FROM THE ADSORBENT RESINS

[75] Inventors: Richard T. Stringfield; H. Robert Goltz; Seth I. Norman; Upen J. Bharwada; Robert L. LaBrie, all of Midland, Mich.

[73] Assignee: The Dow Chemical Company, Midland, Mich.

[21] Appl. No.: 316,058

[22] Filed: Feb. 27, 1989

Related U.S. Application Data

[63] Continuation of Ser. No. 169,538, Mar. 17, 1988, abandoned, and a continuation-in-part of Ser. No. 169,537, Mar. 17, 1988, abandoned.

[51] Int. Cl.$^5$ .......................... C13D 3/12; C13D 3/14
[52] U.S. Cl. ...................................... 127/55; 127/46.2; 127/49; 502/402; 210/670; 210/660; 210/663; 426/271
[58] Field of Search ...................... 127/55, 46.2, 46.1, 127/46.3, 49; 502/402; 210/670, 660, 663; 426/271

[56] References Cited

U.S. PATENT DOCUMENTS

| | | |
|---|---|---|
| 2,578,938 | 12/1951 | Trenton et al. . |
| 3,122,456 | 2/1964 | Meier et al. . |
| 3,966,489 | 6/1976 | Barrett et al. ...................... 127/46.2 |
| 4,191,813 | 3/1980 | Reed et al. . |
| 4,193,817 | 3/1980 | Dillman et al. . |
| 4,263,407 | 4/1981 | Reed, Jr. . |
| 4,382,124 | 5/1983 | Meitzner et al. . |

FOREIGN PATENT DOCUMENTS

| | | |
|---|---|---|
| 203556 | 10/1983 | German Democratic Rep. . |
| 220964 | 4/1985 | German Democratic Rep. . |
| 2209965 | 4/1985 | German Democratic Rep. . |
| 229992 | 11/1985 | German Democratic Rep. . |
| 249703 | 9/1986 | German Democratic Rep. . |
| 249190 | 9/1987 | German Democratic Rep. . |
| 249193 | 9/1987 | German Democratic Rep. . |
| 249194 | 9/1987 | German Democratic Rep. . |
| 249274 | 9/1987 | German Democratic Rep. . |

*Primary Examiner*—H. M. Sneed
*Assistant Examiner*—Chung K. Pak

[57] ABSTRACT

A process for decolorizing an aqueous sugar solution by contacting the solution with an absorbent resin, wherein the adsorbent resin is a macroporous copolymer being post-crosslinked in a swollen state in the presence of a Friedel-Crafts catalyst and functionalized with hydrophilic groups prior to contact with the aqueous sugar solution.

33 Claims, No Drawings

PROCESS FOR DECOLORIZING AQUEOUS SUGAR SOLUTIONS VIA ADSORBENT RESINS, AND DESORPTION OF COLOR BODIES FROM THE ADSORBENT RESINS

CROSS-REFERENCE TO RELATED APPLICATIONS

This is a continuation-in-part of copending U.S. application Ser. No. 169,538, filed Mar. 17, 1988, now abandoned, and U.S. application Ser. No. 169,537, filed Mar. 17, 1988, now abandoned.

BACKGROUND OF THE INVENTION

The present invention relates to a process for decolorizing aqueous sugar solutions with an adsorbent resin prepared under suspension polymerization conditions commonly used for ion exchange resins.

Decolorization is a key process in sugar refining. Traditionally, aqueous sugar solutions are decolorized with carbon adsorbents, such as bone char or granular and powdered activated carbon. Unfortunately, the use of carbon has some negative features In decolorizing with activated carbon, the equipment used in the process is expensive, difficult to operate and to maintain. Another negative feature of carbon is that carbon is abrasive so it is hard on the equipment employed, thereby adding to the replacement cost of the equipment. The fuel for thermal regeneration and carbon replacement of burned carbon are also expensive.

Ion exchange resins have been used to demineralize and decolorize sugar solutions. Unfortunately, the capacity of conventional ion exchange resins for adsorbing color bodies from solution is low relative to the adsorptive capacity of carbon, and the physical stability of some resins used for decolorization is poor. Further, loaded resins require regeneration with strong acids, strong bases, or concentrated salt solutions, which frequently do not remove a substantial quantity of the adsorbed components from the resins, and therefore such resins are prone to fouling during use. These resin characteristics significantly increase the costs associated with using ion exchange resins for decolorizing aqueous sugar solutions, and thus detracts from their commercial viability.

As examples of some of the deficiencies associated with the use of ion exchange resins for decolorizing sugar solutions, the following patents, which describe such processes are discussed and analyzed, U.S. Pat. No. 3,122,456: U.S. Pat. No. 2,578,938: and U.S. Pat. No. 4,193,817.

U.S. Pat. No. 3,122,456 discloses a method of purifying and decolorizing sugar solutions with "spongy" synthetic ion exchange resins. The resins are prepared from crosslinked copolymers permeated by small cavities or veins. Unfortunately, not only do these spongy resins exhibit an adsorptive capacity less than the capacity of carbon, but they also swell considerably upon contact with aqueous solutions - from 200 to 500 percent of their original dry volume. Thus, the resins have very poor physical stability, particularly during acid and base cycling which would be necessary to decolorize a sugar solution and to regenerate the resin. The high swellability and the poor physical stability of the resins additionally increases their tendency to foul during regeneration.

U.S Pat. No. 2,578,938 discloses a method of decolorizing sucrose solutions with a lightly crosslinked ion exchange resin. Unfortunately, this resin exhibits the same characteristics associated with the spongy resins, and therefore represents a poor alternative to carbon for decolorizing sugar solutions.

U.S. Pat. No. 4,193,817 discloses decolorizing a bottler's sugar solution with a strong base anion exchange resin. Once again the adsorptive capacity of the resin is poor relative to that of carbon. The resin is regenerated by first contacting the resin with an aqueous solution of sodium chloride and either an alkali metal or alkaline earth metal hydroxide (required to convert resin to hydroxide ion form) and then contacting the resin with an aqueous solution of either sodium chloride or hydrochloric acid (required to convert resin to the desired chloride ion form for subsequent decolorization of sugar solution). Unfortunately, the high dry weight capacity of the resin requires using large amounts of base or acid regenerants, which increase regeneration cost.

In view of the deficiencies of the prior art, a process for decolorizing sugar solutions with an adsorbent having an adsorptive capacity similar to that of carbon is needed. Furthermore, a process employing an effective adsorbent with good physical properties that can be easily and cost-effectively regenerated is needed.

SUMMARY OF THE INVENTION

The present invention is a process for decolorizing an aqueous sugar solution containing color bodies. The process comprises the step of contacting an aqueous sugar solution with an effective amount of an adsorbent resin so as to adsorb color bodies from the aqueous sugar solution onto the adsorbent resin, wherein the adsorbent resin is derived from a macroporous copolymer of a monovinyl aromatic monomer and a crosslinking monomer, where the macroporous copolymer has been post-crosslinked in the swollen state in the presence of a Friedel-Crafts catalyst and functionalized with hydrophilic groups.

The process provides an effective means for decolorizing an aqueous sugar solution without using carbon adsorbents. The adsorbent resin can be as effective as carbon in adsorbing or removing color bodies from sugar solutions. The post-crosslinking of the macroporous copolymer in a swollen state increases the surface area of the copolymer, increases porosity, reduces average pore size, reduces shrink/swell, and imparts rigidity to the copolymer structure.

Moreover, even after functionalizing the copolymer to form the resin, the adsorbent resin maintains the above described properties. In addition, after functionalization, the resin has hydrophilic characteristics. These properties enhance the adsorptive capacity of the resin relative to conventional ion exchange resins used for decolorization. Because of reduced shrink/swell, increased rigidity of the resin structure, and other properties derived from post-crosslinking, the adsorbent resin can be easily regenerated.

DETAILED DESCRIPTION OF THE INVENTION

For purposes of describing this invention, a macroporous copolymer is broadly defined to include copolymers prepared by suspension polymerization of a monomer composition under conditions conventionally used to prepare ion exchange resins, in the presence of one or more porogenic diluents using quantities sufficient to cause phase separation of the prepared copolymer from the diluent. Although, it should be noted that there are many other polymerization techniques known in the art for preparing copolymers which could be useful in polymerization herein.

When a macroporous copolymer is contacted with a swelling solvent, such as chloromethyl methyl ether, its structure is characterized by the presence of regions of densely packed polymer chains separated by pores, often referred to as mesopores (50 to 200 Å and macropores (>200 Å). The nonuniformity of the internal structure of a swollen macroporous copolymer causes the copolymer to appear opaque because of its ability to refract light. If inert diluents or swelling solvents are removed from the macroporous copolymer, for example by subjecting the copolymer to vacuum or steam distillation, then in many instances the pores will collapse from the stress of internal pressures created by increased attractive forces among the regions of packed polymer chains, and the copolymer would then appear transparent or translucent. A class of macroporous copolymers has been developed which retains its porous structure even upon removal of inert diluents or swelling solvents. Such macroporous copolymers are referred to as "macroreticular" copolymers and are described in U.S. Pat. No. 4,382,124. They are characterized by their opaque appearance, regardless of whether or not the copolymer is examined in the presence or absence of inert diluents or swelling solvents.

Processes for preparing macroreticular copolymers of a monovinyl aromatic monomer and a crosslinking monomer, which have been post-crosslinked with a polyfunctional alkylating or acylating compound in a swollen state in the presence of a Friedel-Crafts catalyst, are disclosed in U.S. Pat. Nos. 4,191,813 and 4,263,407, herein incorporated by reference. Such macroreticular copolymers are referred to as "macronet polymeric adsorbents". A macronet polymeric adsorbent can be functionalized with hydrophilic groups using conventional methods for functionalizing copolymers which are prepared via suspension polymerization with ion exchange groups. For example, the polymeric adsorbent can be functionalized by aminating a chloromethylated polymeric adsorbent with either a dimethylamine, trimethylamine, or dimethylethanolamine, depending on whether weak base or strong base functionality is desired. Similarly, the macronet polymeric adsorbent can be functionalized by sulfonation. Alternatively, a chloromethylated polymeric adsorbent can be functionalized by solvolysis at elevated temperatures.

The most preferred process for preparing adsorbent resins which have been post-crosslinked in a swollen state in the presence of a Friedel-Crafts catalyst is described in East German Pat. No. DD 249,274 A1, herein incorporated by reference. This patent describes post-crosslinking a "solvent-free", chloromethylated macroporous copolymer of styrene and divinylbenzene. After chloromethylation, the copolymer is first contacted with a washing agent, such as methanol, and then the washing agent is removed by either drying the washed copolymer or extracting the washing agent with the swelling solvent used for the subsequent post-crosslinking reaction. After post-crosslinking the chloromethylated copolymer, the copolymer can be functionalized with hydrophilic groups in the conventional manner, thereby producing a useful adsorbent resin. If it is desirable, functionalization could also be performed before post-crosslinking the copolymer.

Although the East German patent only describes a process for preparing adsorbent resins from macroporous copolymers of styrene and divinylbenzene, the process can be used to prepare other macroporous copolymers of a monovinyl aromatic monomer and a crosslinking monomer. These copolymers can be used to produce other adsorbent resins which can be employed to decolorize aqueous sugar solutions.

Regardless of the method used for functionalizing the post-crosslinked macroporous copolymer, after functionalization, the adsorbent resin's hydrophilic character increases its efficiency to adsorb color bodies from sugar solutions and desorption of those color bodies from the resin. Desorption can be accomplished with an aqueous base or an organic solvent, such as ethanol. Preferably, the macroporous copolymer is functionalized by first chloromethylating the copolymer, post-crosslinking the copolymer and then aminating the chloromethylated post-crosslinked copolymer with dimethylamine, trimethylamine or dimethylethanolamine. Most preferably, the post-crosslinked macroporous copolymer is functionalized by aminating the chloromethylated copolymer with dimethylamine. Using conventional ion exchange terminology, an adsorbent resin functionalized in this manner and then contacted with an acidic solution is thus converted to its acid form, which is the form desired for decolorizing many aqueous sugar solutions.

Preferred monovinyl aromatic monomers are styrene and its derivatives, such as α-methylstyrene and vinyl toluene: vinyl naphthalene; vinylbenzyl chloride and vinylbenzyl alcohol. Crosslinking monomers broadly encompass the polyvinylidene compounds listed in U.S. Pat. No. 4,382,124. Preferred crosslinking monomers are divinylbenzene (commercially available divinylbenzene containing less than about 45 weight percent ethylvinylbenzene), trivinylbenzene, and ethylene glycol diacrylate.

The preferred macroporous copolymer is a copolymer of up to about 99.75 weight percent styrene with the balance divinylbenzene. Another preferred macroporous copolymer is a copolymer of about 40 to about 60 weight percent styrene, about 40 to about 60 weight percent vinylbenzyl chloride and about 1 to about 20 weight percent divinylbenzene. The macroporous copolymers may contain minor amounts of other monomers, such as the esters of acrylic and methacrylic acid, and acrylonitrile.

The crosslinker serves to increase the physical stability of the adsorbent resin. The amount of crosslinker required depends significantly on the process conditions used to prepare the copolymer and can range anywhere from about 1 to about 45 percent by weight of total monomer, preferably from about 4 to about 8 percent by weight.

Post-crosslinking in a swollen state displaces and rearranges polymer chains, causing an increase in the number of micropores (<50Å diameter) and mesopores. This increases porosity and surface area and decreases average pore size. Just as significantly, post-crosslinking also imparts rigidity to the polymer, which reduces its tendency to shrink or swell upon contact with an aqueous solution (often referred to in the ion exchange art as the "shrink/swell") and reduces its dry weight capacity when functionalized, which is an indication of its ion exchange capacity. These properties as characterized above increase the capacity of the adsorbent resin to adsorb color bodies, increase its permeability to sugar solutions, and increase its physical and dimensional stability.

Furthermore, the reduced shrink/swell and dry weight capacity of the adsorbent resin, which post-crosslinking induces, is conducive to simple, inexpensive and efficient regeneration once color bodies are loaded onto the resin. The reduced dry weight capacity allows desorption of color bodies from the loaded resin with a dilute base. Concentrated bases or acids are unnecessary for regeneration or cleaning. The reduced shrink/swell property allows the resin to maintain sufficient porosity to minimize entrapment of color bodies, and this property in combination with the reduced dry weight capacity reduces the tendency of the resin to retain color bodies during regeneration.

The amount of post-crosslinking required for any given application is an amount effective to achieve the adsorbent resin properties described above to the extent desired.

The adsorbent resin preferably has a surface area of about 150 to about 2100 square meters per gram of dry adsorbent resin ($m^2/g$), more preferably about 700 to about 1400 $m^2/g$. Surface area is measured by BET nitrogen adsorption techniques. Porosity ranges from about 0.10 to about 0.70 cubic centimeters of pore volume per cubic centimeter of resin (cc/cc), preferably about 0.43 to about 0.58 cc/cc, as calculated from BET nitrogen adsorption techniques. The porosity contributed by micropores ranges from about 30 to about 100 percent, preferably about 30 to about 50 percent, depending on the resin characteristics. Percent shrink/swell ranges below about 15 percent, more preferably below about 7 percent, and most preferably below about 4 percent. Percent shrink/swell is determined by measuring the volume expansion or contraction of the adsorbent resin when subjected to hydration or a change in ionic form. The dry weight capacity, determined according to conventional methods used for characterizing ion exchange resins, ranges from greater than zero to about 4 0 milliequivalent per gram (meq/g), preferably from greater than zero to about 2.0 meq/g. If the macroporous copolymer is functionalized by solvolysis, for example by contact with water or an alcohol, then the dry weight capacity is essentially zero.

The adsorbent resin can be used in the form of beads, pellets or any other form desirable for decolorizing aqueous sugar solutions. If the adsorbent resin is used in the form of beads, bead size ranges from about 10 to about 1000 microns ($\mu$), preferably from about 100 to about 800 $\mu$, and more preferably from about 300 to about 800 $\mu$.

Examples of aqueous sugar solutions that are advantageously treated according to the present invention include carbohydrate solutions derived from corn starch, such as corn syrup, high fructose corn syrup, dextrose, and sorbitol: sucrose, beet and cane sugar, palm sugar, maple sugar: fruit juices, either natural or processed, such as pear, apple, grape and pineapple mill juices: sugar solutions derived from sorghum: and high fructose syrups derived from tapioca, inulin and potato starch. Preferably, the sugar solution is a solution of corn syrup, high fructose corn syrup, sorbitol, sucrose or dextrose.

The term "decolorizing" refers to removing color bodies from solution to the extent necessary or desired. The decolorization of sugar solutions and more particularly high fructose corn syrup is not an ion exchange phenomena, but is mainly a Van der Waal type interaction of the color bodies with the adsorbent resin. Although identifying color bodies is difficult, it is believed that the color bodies consist of three basic groups. These groups are: (1) caramels, (2) melanoidins and (3) polyphenolics and flavanoids. The caramels are thermal degradation products of sugars: melanoidins are, in general, Maillard reaction products of amine compounds and sugar groups: and the polyphenolics and flavanoids are oxidation products of phenolic compounds derived from a raw sugar solution.

In addition to the three classes of color bodies, there are several noncolored compounds that can develop color, or react to form color bodies during processing or storage of sugar solutions. Such materials are known as color precursors, and for the purpose of describing this invention, the term "color bodies" is intended to include such color precursors. These precursors include amino acids: many hydroxy acids and aldehydes: iron, which complexes with phenolics to make color bodies: 5-hydroxymethyl-2-furfural (HMF): 3-deoxy-d-glucosone (3-D-G) and reducing sugars. These materials often have low molecular weights and are difficult to remove from a sugar solution.

The degree of decolorization necessary or desired will vary from industry to industry or solution to solution. For example, in the beet and cane sugar industry, solutions typically have color levels up to thousands of Reference Base Units (RBU), which is defined more fully hereinafter, with the goal of removing sufficient color bodies so that the solutions have color levels no more than hundreds of RBU. In the high fructose corn syrup industry, color levels rarely go beyond a few hundred RBU with the goal of producing a water white syrup having only a few RBU of color.

The adsorbent resin and the sugar solution may be contacted using conventional methods which result in intimate contact between the resin and the sugar solution. Suitable methods include fluidized beds, stirred tanks, batch tanks, and cocurrent and countercurrent flow columns. The contacting may occur batchwise, semi-batchwise, continuously or semi-continuously. Preferably, the solution is contacted with the resin continuously in a packed column.

The residence time required for contact between the adsorbent resin and the sugar solution depends on the following: (1) the properties of the resin, (2) the amount of color bodies initially present, (3) the level of decolorization desired, (4) the amount of resin used, (5) the viscosity of the sugar solution, (6) the concentration of dissolved sugar (often referred to as dissolved solids), (7) the processing temperature, and (8) the pH of the sugar solution. Therefore, the residence time must be determined empirically. Preferably, the residence time ranges from about 0.1 hours (10 bed volumes/hr) to about 10 hours (0.1 bed volumes/hr), more preferably about 0.12 hours (8 bed volumes/hr) to about 1 hour (1 bed volume/hr), and most preferably about 0.17 hours (6 bed volumes/hr) to about 0.5 hours (2 bed volumes/hr).

The temperature should remain below the temperature at which the sugar solution is adversely affected. Generally, temperatures ranging from about 20° C. to about 80° C. are operable. Preferably, the temperature ranges between about 38° C. and about 55° C.

The amount of adsorbent resin required, largely depends on equipment configuration, concentration of dissolved solids, the level and type of color bodies present, and the level of decolorization desired. Treatment rates are often expressed in terms of pounds of dry solids that are treated per cubic foot of the adsorbent resin, (lbs. D.S./C.F. resin). Suitable treatment rates range from about 25 to about 10,000 lbs. D.S./C.F. resin: preferably from about 500 to about 5,000 lbs. D.S./C.F. resin: and most preferably from about 1,000 to about 4,000 lbs. D.S./C.F. resin.

The pH of the sugar solution is preferably maintained at a level which allows for the optimum adsorption of color bodies by the adsorbent resin. The pH of the sugar solution prior to decolorization depends on previous processing steps. It is desirable to contact the adsorbent resin with the sugar solution at a pH ranging from about 1 to about 7, preferably from about 3 to about 6, and more preferably from about 4 to about 5.

The amount of dissolved sugar present in the sugar solution will vary with the sugar source. The amount of dissolved sugar ranges up to about 70 weight percent with about 20 to about 50 weight percent being more preferred.

Once color bodies are loaded onto the adsorbent resin, it is desirable and preferable to desorb those color bodies from the resin using a regeneration process that takes advantage of existing equipment and process streams available to the sugar refiner. Additionally, it would be advantageous to avoid the requirement of transferring the resin from a decolorization facility to a regeneration facility. Therefore, in the preferred process, the adsorbent resin is used in a packed column not only to decolorize the sugar solution, but also to regenerate the resin for the next decolorization cycle.

As described above, the reduced dry weight capacity of an adsorbent resin allows desorption of color bodies from the loaded resin with a dilute base. This is particularly advantageous for the sugar refiner because a dilute base is readily available from a waste stream: namely, the regeneration effluent from an anion exchange resin used for demineralizing the aqueous sugar solution.

An aqueous sugar solution is demineralized by removing cationic and anionic impurities, e.g., $Ca^{++}$, $Mg^{++}$, $HSO_3-$, $Cl-$, and $SO_4--$. Cationic impurities are removed from the solution by contact with a strong acid cation exchange resin in the hydrogen form. Anionic impurities are subsequently removed by contact with a weak base anion exchange resin in the free base form. The cation exchange resin is regenerated by contact with an aqueous solution of hydrochloric acid or sulfuric acid. The anion exchange resin is regenerated by contact with an aqueous solution of sodium hydroxide, soda ash or ammonium hydroxide.

The composition of the regeneration effluent from the anion exchange resin contains not only sodium hydroxide, soda ash, ammonium hydroxide, or mixtures of these, but also impurities removed from the sugar solution, such as chloride salts or sulfate salts. An effluent contains an aqueous solution with a maximum of about 2 weight percent sodium hydroxide, 1.5 weight percent sodium chloride, and 2 weight percent sodium sulfate. Another typical effluent contains about 2 weight percent ammonium hydroxide, 2 weight percent ammonium chloride, and 2 weight percent ammonium sulfate. Preferably, the effluent is an aqueous solution containing sodium hydroxide, sodium chloride and sodium sulfate.

The degree of desorption of color bodies from the loaded adsorbent resin depends on the hydrogen or hydroxide ion concentration of the regeneration effluent and the amount of effluent contacting the adsorbent resin. The total number of hydroxide ions should exceed the number of active ion exchange sites which the resin possesses. The hydroxide ion concentration of the effluent when contacted with the resin desirably ranges from about 0.01N to about 2.0N, preferably from about 0.05N to about 0.5N.

The degree of desorption increases as the volume of effluent contacting the resin increases. Therefore, it is usually advantageous to dilute the effluent with water until an optimum balance is reached between hydroxide ion content and volume of effluent. An effective amount of effluent is that which is required to achieve the desired degree of desorption. Preferably, a sufficient volume of effluent contacts the resin to desorb at least about 60 percent of color bodies, more preferably at least about 75 percent, and most preferably at least about 85 percent. Percent desorption is based on Reference Basis Units (RBU).

In a preferred embodiment of this invention, a packed column of adsorbent resin used for decolorizing the aqueous sugar solution is treated prior to contact with the regeneration effluent. The resin is treated by contacting the packed column thereof with an effective amount of water to remove residual sugar, and backwashing the packed column to classify and expand the column and to remove particulate contaminants.

In another preferred embodiment, a desorbed adsorbent resin functionalized with weakly basic groups, for example tertiary amine groups from the amination of the chloromethylated copolymer with dimethylamine, is treated with acid to convert the adsorbent resin to the acid form. As discussed previously, the acid form is the preferred form desired for decolorizing many aqueous sugar solutions.

The treatment can be carried out by first contacting the adsorbent resin used in the process of this invention with an effective amount of water to rinse residual hydroxide ions remaining from prior contact with regeneration effluent. The rinsed adsorbent resin may be converted to the acid form by contact with syrup or an acidic solution, such as: (1) an aqueous solution of hydrochloric or sulfuric acid, (2) an acidic sugar solution, for example a sugar solution effluent from a cation exchange resin or (3) regeneration effluent from a cation exchange resin used for demineralizing an aqueous sugar solution. The amount of effluent contacted with the adsorbent resin is desirably that which is necessary to maintain the pH of the aqueous sugar solution below about 6 when contacted with the treated copolymer.

Although what has been described relates only to the use of an adsorbent resin for decolorizing an aqueous sugar solution, the adsorbent resin can be used in combination with other resins, modifiers, stabilizers, and the like, to improve the performance of the adsorbent resin or to enhance its desirability for other applications. For example, the adsorbent resin can be used in combination with conventional cation and anion exchange resins in mixed bed units for polishing aqueous sugar solutions, particularly high fructose corn syrup.

The following examples illustrate, but are not intended to limit the scope of this invention.

EXAMPLE 1

Six samples of adsorbent resin with varying properties are prepared using the procedures described in East German Pat. No. DD 249,274 A1. Each of the six samples is prepared by post-crosslinking a chloromethylated, macroporous copolymer of styrene and divinylbenzene. Each sample is then functionalized by aminating the chloromethylated copolymer with dimethylamine. The properties of each of the six samples, designated as Samples 1-6, are reported in Table 1. Two additional samples of adsorbent resin with differing properties are prepared by aminating the chloromethylated macrorecticular adsorbent copolymer substantially described in Example 4 of U.S. Pat. No. 4,263,407. The properties of each sample, designated as Samples 7-8, are also reported in Table 1.

TABLE I

| Sample | Dry Weight Capacity (meq/g) | Porosity (cc/cc) | Surface Area (m²/g) | Average Pore Size (Å) | Percent Shrink/Swell (ionic form) |
|---|---|---|---|---|---|
| C-2* | 5.08 | 0.32 | 150 | 123 | 30 |
| 1[1] | 3.53 | 0.47 | 400 | 80 | 11.5 |
| 2[1] | 2.91 | 0.51 | 626 | 63 | 9 |
| 3[1] | 1.99 | 0.52 | 1065 | 45 | 7 |
| 4[1] | 1.21 | 0.56 | 1374 | 18 | 1.2 |
| 5 | 1.18 | 0.65 | — | — | 0 |
| 6[2] | 0.30 | 0.57 | 1696 | 25 | 1 |
| 7[2] | 2.03 | 0.33 | 609 | 32 | 6.1 |
| 8[2] | 2.53 | 0.40 | 624 | 31 | 7.2 |

C-2 is a macroporous styrene-divinylbenzene copolymer chloromethylated and aminated with dimethylamine to prepare a conventional weak base anion exchange resin.
*Not an example of the present invention.
[1]Surface area and average pore size measured by a BET sorption analyzer sold commercially by Micromeritics Instrument Corp. as Digisorb 2500.
[2]Surface area and average pore size measured by a BET sorption analyzer sold commercially by Quantachrome Corp. at Autosorb 6

In separate runs, varying amounts of the adsorbent resin, Samples 1-3 in the free base form are placed in a 3-necked, 250 ml flask equipped with a stirrer, thermometer, and a heating mantle. In each case, the adsorbent resin is added to the reactor after soaking in water and centrifuging to remove residual water. The high fructose corn syrup (HFCS) to be decolorized is added with an initial RBU value of 440 as measured by the ICUMSA Color Method Four, Schneider, F., 1979, Sugar Analysis ICUMSA, Wharf Road, Peterborough, England. The reactor temperature is maintained between 50° to 60° C. for 30 minutes. The reactor is then cooled in an ice bath to 20° C. The decolorized HFCS is filtered to remove all particulates and the RBU color is measured spectrophotometrically and calculated as described below:

$$RBU = 1000 \times \left[ \frac{\text{absorbance @ 420 nm} - 2(\text{absorbance @ 720 nm})}{(b)(c)} \right]$$

RBU = Reference Base Unit
nm = nanometer
b = cell length in cm
c = syrup concentration in gm/ml Similar runs are performed using Calgon CPG 12/40 mesh granular activated carbon (C-1), a functionalized macroporous copolymer which has not been post-crosslinked (C-2), and Dowex® 66 for comparison purposes.

The results are illustrated in Table II.

TABLE II

| | Reference Base Units (RBU) Weight Percent[1] of Decolorizing Agent in HFCS | | |
|---|---|---|---|
| Sample | 1 percent | 2.5 percent | 5 percent |
| C-1* | 400 | — | 223 |
| C-2* | — | 243 | 313 |
| C-3* | 478 | — | 211 |
| 1 | — | 155 | 140 |
| 2 | 381 | — | 71 |
| 3 | — | 165 | 50 |

C-1 is Type CPG Granular Carbon sold commercially by Calgon Corporation.
C-2 is a macroporous styrene-divinylbenzene copolymer chloromethylated and aminated with dimethylamine to prepare a conventional weak base anion exchange resin.
C-3 is Dowex® 66 macroporous anion exchange resin available from The Dow Chemical Company.
*Not an example of the present invention
[1]Weight percent is calculated based on the dry weight of the decolorizing agent.

EXAMPLE 2

The adsorbent resins of Samples 1, 2, and 4-8 are subjected to an equilibrium adsorption test. The procedure of Example 1 is essentially repeated, except that the adsorbent resins are in the hydrochloric acid form rather than the free base form and the untreated HFCS exhibits an RBU value of 353 instead of 440.

The adsorbent resins are placed in the hydrochloric acid form by slurrying the adsorbent resin in the free base form in a solution of 1N hydrochloric acid. After standing for about 1 hour, the adsorbent resin is backwashed with deionized water until the effluent is neutral (pH about 7). The adsorbent resins are then centrifuged to remove excess water.

The results are illustrated in Table III.

TABLE III

| | Reference Base Units (RBU) Weight Percent[1] of Decolorizing Agent of HFCS | | | | |
|---|---|---|---|---|---|
| Sample | 1 percent | 2.5 percent | 5 percent | 10 percent | 20 percent |
| C-1* | 212 | 170 | 119 | 57 | 22 |
| C-2* | 200 | 82 | 59 | 58 | 56 |
| 1 | 100 | 65 | 57 | 45 | 33 |
| 2 | 98 | 53 | 45 | 29 | 11 |
| 4 | 107 | 41 | 19 | 7 | — |
| 5 | 100 | 73 | 48 | 24 | 4 |
| 6 | 185 | 76 | 38 | 30 | 7 |
| 7 | 150 | 110 | 88 | 57 | 26 |
| 8 | 173 | 133 | 92 | 61 | 38 |

C-1 is Type CPG granular carbon sold commercially by Calgon Corporation.
C-2 is a macroporous styrene-divinylbenzene copolymer chloromethylated and aminated with dimethylamine to prepare a conventional weak base anion exchange resin.
*Not an example of the present invention.
[1]Weight percent is calculated based on the dry weight of the decolorizing agent.

Once again, the reduced RBU values illustrated in Table III indicate that the claimed process provides a superior method of decolorizing HFCS.

EXAMPLE 3

In a one-inch column, a dextrose solution containing 30 percent dissolved solids and exhibiting an RBU color value of 40 is contacted with the adsorbent resin designated as Sample 3 of Example 1. The solution is contacted with a 400 ml bed of the adsorbent resin in the HCl form. The flow rate is maintained at 4 bed volumes/hour for a period of time equivalent to 140 bed volumes. The temperature of the dextrose solution is about 50° C.

The solution exiting the column is analyzed for RBU value and exhibits values from 2 to 6 with an average of 4 RBU through 140 bed volumes. The results illustrate the effectiveness of the present invention as a means of removing color bodies from solutions containing sugar.

EXAMPLE 4

In a one-inch column, a dextrose solution containing 50 percent dissolved solids and exhibiting an RBU color value of 390 is contacted with the adsorbent resin designated as Sample 3 of Example 1. The solution is contacted with a 400 ml bed of the adsorbent resin in the HCl form. The flow rate is maintained at 4 bed volumes/hour for a period of time equivalent to 100 bed volumes. The temperature of the dextrose solution is about 50° C.

After 100 bed volumes, the solution exiting the column is analyzed for RBU value. The RBU value is less than 100. This result illustrates that even at higher RBU values the present invention is effective in removing a major percentage of the color bodies.

EXAMPLE 5

In an 8 mm I.D. by 100 mm glass column is loaded 5 ml of adsorbent resin in the hydroxide form having properties similar to the macroporous copolymer designated as Sample 3 of Example 1, except that the post-crosslinked chloromethylated copolymer is aminated with trimethylamine instead of dimethylamine. The column temperature is maintained at 50° C. A beet sugar solution is metered through the column at a rate of 0.2 ml/min. The adsorbance of effluent is continually monitored at a wavelength of 420 nm using a spectrophotometer equipped with a flow cell. The percent color leakage is determined by adjusting the maximum transmission (zero percent color leakage) using deionized water for the lower limit and adjusting the minimum transmission (100 percent color leakage) using the neat beet sugar solution for the upper limit. The percent color leakage is defined as the color not adsorbed by the adsorbent resin. The results are summarized in Table IV under Sample 9.

TABLE IV

| | Percent Color Leakage | | | | | |
|---|---|---|---|---|---|---|
| Sample | 1 Hr. | 2 Hrs. | 3 Hrs. | 4 Hrs. | 5 Hrs. | 6 Hrs. |
| C-4* | 8.7 | 16.0 | 19.8 | 25.0 | 29.2 | — |
| 9 | 2.5 | 4.8 | 7.5 | 12.4 | 17.7 | 21.5 |

C-4 is DOWEX ® MSA-1 macroporous anion exchange resin available from The Dow Chemical Company.
*Not an example of the invention.

The data illustrates the effectiveness of the present invention in removing color bodies from beet sugar solutions compared to a conventional macroporous anion exchange resin.

EXAMPLE 6

In a 13 mm diameter column, an apple juice containing 15 percent dissolved solids and exhibiting an RBU color value of 4500 is contacted with the adsorbent resin designated as Sample 3 of Example 1. The juice is contacted with a 10 ml bed of the adsorbent resin in the HCl form. The flow rate is maintained at 6 bed volumes/hour for a period of time equivalent to 30 bed volumes. The temperature of the apple juice is ambient or approximately 20° C.

The apple juice exiting the column is analyzed for RBU value and exhibits values from 91 to 1035. Within the industry, an acceptable RBU color level is 1195. The results illustrate that even at very high RBU values the present invention is effective in removing a major percentage of the color bodies.

EXAMPLE 7

5 Ml of the adsorbent resin, essentially the same as Sample 3 of Example 1, in the hydrochloric acid form, is placed in an 8 mm ID × 100 mm glass column. The column temperature is maintained at 50° C. The resin is loaded with color bodies by passing a synthetic dextrose syrup through the resin. The synthetic dextrose syrup contains 50 percent dissolved dextrose, 1.170 mg/liter of NaCl, 150 mg/liter of nitrogen (as glycine), 16.7 mg/liter of 5-hydroxymethyl-2-furfural, 100 ppb of acetaldehyde. Color is imparted to the syrup by heating the solution to 70° C. and adjusting the pH to 8, then cooling the solution to 40° C. and lowering the pH to about 4.0. The syrup has a pH of about 4.0 and exhibits an RBU value ranging from 300–650. The synthetic dextrose syrup is pumped through the column of adsorbent resin at 4 bed volumes per hour until the desired level of decolorization is obtained. The column is then cooled to ambient temperature for the desorption cycle. The resin is washed with water to remove residual sugar.

An aqueous solution of 2.0 percent NaOH, 1.0 percent NaCl, and 0.5 percent $Na_2SO_4$ is prepared. This caustic solution is representative of a regeneration effluent from an anion exchange resin used for demineralizing an aqueous sugar solution. Three bed volumes of the above solution are diluted in a ratio of 4 parts water to 1 part solution to give a total volume of 15 bed volumes. The loaded adsorbent resin is desorbed by initially contacting the resin with about 5 bed volumes of the diluted caustic solution to substantially convert the adsorbent resin to the free base form and then contacting the adsorbent resin with about 10 bed volumes of the diluted caustic solution at a flow rate of about 1.2 bed volumes per hour to desorb the color bodies.

The percentage of color bodies desorbed from the adsorbent resin is determined by dividing the total amount of color bodies in the caustic regenerant solution by the total amount of color bodies adsorbed from the sugar solution. The results are illustrated in Table V.

TABLE V

| Bed Volumes Regenerant | Percent Color Bodies Desorbed |
|---|---|
| 0.3 | 1.0 |
| 1.2 | 41.2 |
| 2.4 | 88.2 |
| 3.6 | 91.2 |
| 6.0 | 93.4 |
| 9.6 | 96.5 |

What is claimed is:

1. A process for decolorizing an aqueous sugar solution containing color bodies, comprising the step of contacting an aqueous sugar solution with an effective amount of an adsorbent resin so as to adsorb color bodies from said aqueous sugar solution onto said adsorbent resin, wherein said adsorbent resin is made from a macroporous copolymer of a monovinyl aromatic monomer and a crosslinking monomer, where the macroporous copolymer has been post-crosslinked in the swollen state in the presence of a Friedel-Crafts catalyst and functionalized with hydrophilic groups.

2. The process of claim 1 wherein the crosslinking monomer is a polyvinylidene monomer.

3. The process of claim 2 wherein the polyvinylidene monomer id divinylbenzene, trivinylbenzene or ethylene glycol diacrylate.

4. The process of claim 3 wherein the monovinyl aromatic monomer is styrene vinylbenzyl chloride, vinylbenzyl alcohol, or vinylnaphthalene.

5. The process of claim 4 wherein the macroporous copolymer contains up to about 99.75 weight percent styrene with the balance divinylbenzene.

6. The process of claim 1 wherein the macroporous copolymer contains from about 1 to about 45 weight percent of the crosslinking monomer.

7. The process of claim 6 wherein the adsorbent resin contains from about 4 to about 8 weight percent of the crosslinking monomer.

8. The process of claim 1 wherein the macroporous copolymer is chloromethylated.

9. The process of claim 1 wherein the macroporous copolymer is post-crosslinked with a polyfunctional alkylating or acylating compound.

10. The process of claim 1 wherein the post-crosslinked macroporous copolymer is functionalized with dimethylamine, trimethylamine or dimethylethanolamine.

11. The process of claim 1 wherein the post-crosslinked copolymer is functionalized by solvolysis.

12. The process of claim 1 wherein the post-crosslinked copolymer is functionalized by sulfonation.

13. The process of claim 1 wherein the adsorbent resin has a surface area of about 150 to about 2100 $m^2/g$.

14. The process of claim 13 wherein the adsorbent resin has a surface area of about 700 to about 1400 $m^2/g$.

15. The process of claim 1 wherein the adsorbent resin has a porosity of about 0.10 to about 0.70 cc/cc.

16. The process of claim 15 wherein the adsorbent resin has a porosity of about 0.43 to about 0.58 cc/cc.

17. The process of claim 1 wherein the adsorbent resin exhibits a percent shrink/swell below about 7 percent.

18. The process of claim 17 wherein the adsorbent resin exhibits a percent shrink/swell below about 4 percent.

19. The process of claim 1 wherein the dry weight capacity of the adsorbent resin ranges from about greater than zero to about 4.0 meq/g.

20. The process of claim 19 wherein the dry weight capacity of the adsorbent resin ranges from about greater than zero to about 2.0 meq/g.

21. The process of claim 1 wherein the aqueous sugar solution is a solution of corn syrup, a fruit juice, sucrose, or dextrose.

22. The process of claim 1 wherein the aqueous sugar solution is contacted with the adsorbent resin continuously in a packed column.

23. The process of claim 1 wherein the amount of the adsorbent resin employed is from about 1,000 to about 4,000 lbs.D.S./C.F. resin.

24. The process of claim 1 further comprising the step of desorbing color bodies from the adsorbent resin by contacting the resin with a regeneration effluent from an anion exchange resin used for demineralizing the aqueous sugar solution.

25. The process of claim 24 wherein the regeneration effluent is an aqueous solution comprising sodium hydroxide, sodium chloride and sodium sulfate.

26. The process of claim 24 wherein the hydroxide ion concentration of the regeneration effluent ranges from about 0.05N to about 0.5N.

27. The process of claim 24 wherein a sufficient volume of regeneration effluent contacts the adsorbent resin to desorb at least about 85 percent of the color bodies from the copolymer.

28. The process of claim 24 wherein a packed column of the adsorbent resin used for decolorizing the aqueous sugar solution is treated prior to contact with the regeneration effluent by contacting the packed column with an effective amount of water to remove residual sugar and then backwashing the packed column to classify and expand the column and to remove particulate contaminants.

29. The process of claim 24 further comprising the step of contacting the desorbed adsorbent resin with an effective amount of water to remove residual hydroxide ions remaining from contact with the regeneration effluent.

30. The process of claim 29 wherein the post-crosslinked macroporous copolymer is functionalized with dimethylamine, trimethylamine or dimethylethanolamine.

31. The process of claim 30 further comprising the step of converting the adsorbent resin to the acid form by contacting the adsorbent resin with an acidic solution.

32. The process of claim 1 wherein the adsorbent resin is used in combination in a mixed bed unit with a cation exchange and an anion exchange resin.

33. The process of claim 21 wherein the corn syrup solution is high fructose corn syrup.

* * * * *

UNITED STATES PATENT AND TRADEMARK OFFICE
CERTIFICATE OF CORRECTION

PATENT NO. : 4,950,332

DATED : August 21, 1990

Page 1 of 4

INVENTOR(S) : Richard T. Stringfield; H. Robert Goltz; Seth I. Norman; Upen J. Bharwada; Robert L. LaBrie It is certified that error appears in the above-identified patent and that said Letters Patent is hereby corrected as shown below:

Title page, column 2, in the section [56] FOREIGN PATENT DOCUMENTS, "2209965" should correctly appear --220965--;

Column 1, line 23, after the word "features" insert --.--;

Column 3, line 10, "(50 to 200 Å" should correctly appear --(50 to 200 Å)--;

Column 4, line 31, "toluene:" should correctly appear --toluene;--;

Column 5, line 40, "4 0" should correctly appear --4.0--;

Column 5, line 56, "sorbitol:" should correctly appear --sorbitol;--;

Column 5, line 57, "maple sugar:" should correctly appear --maple sugar;--;

Column 5, line 59, "juices:" should correctly appear --juices;--;

Column 5, line 59, "sorghum:" should correctly appear --sorghum;--;

UNITED STATES PATENT AND TRADEMARK OFFICE
CERTIFICATE OF CORRECTION

PATENT NO. : 4,950,332

DATED : August 21, 1990

INVENTOR(S) : Richard T. Stringfield; H. Robert Goltz; Seth I. Norman; Upen J. Bharwada; Robert L. LaBrie It is certified that error appears in the above-identified patent and that said Letters Patent is hereby corrected as shown below:

Column 6, line 6, "sugars:" should correctly appear --sugars;--;

Column 6, line 8, "groups:" should correctly appear --groups;--;

Column 6, line 18, "acids:" should correctly appear --acids;--;

Column 6, line 18, "aldehydes:" should correctly appear --aldehydes;--;

Column 6, line 19, "bodies:" should correctly appear --bodies;--;

Column 7, line 5, "resin:" should correctly appear --resin;--;

Column 7, line 6, "resin:" should correctly appear --resin;--;

Column 7, line 36, "stream:" should correctly appear --stream;--;

Column 10, line 19, after TABLE II footnotes and before EXAMPLE 2, insert the following paragraph: --

UNITED STATES PATENT AND TRADEMARK OFFICE
CERTIFICATE OF CORRECTION

PATENT NO. : 4,950,332

DATED : August 21, 1990

INVENTOR(S) : Richard T. Stringfield; H. Robert Goltz; Seth I. Norman; Upen J. Bharwada; Robert L. LaBrie It is certified that error appears in the above-identified patent and that said Letters Patent is hereby corrected as shown below:

The reduced RBU values illustrated in Table II for Samples 1-3 indicate that the claimed process provides a superior method of decolorizing HFCS.--;

Column 12, line 40, after the word "hour" insert --,--;

Column 12, line 58, after TABLE V insert the following paragraph: --The data illustrates the effectiveness of the synthetic waste regenerant stream in desorbing color bodies from the adsorbent resin.--;

Column 13, line 6, "id" should correctly appear --is--;

UNITED STATES PATENT AND TRADEMARK OFFICE
CERTIFICATE OF CORRECTION

PATENT NO. : 4,950,332

DATED : August 21, 1990

INVENTOR(S) : Richard T. Stringfield; H. Robert Goltz; Seth I. Norman; Upen J. Bharwada; Robert L. LaBrie It is certified that error appears in the above-identified patent and that said Letters Patent is hereby corrected as shown below:

Column 14, line 4, "sucrose," should correctly appear --sucrose--.

Signed and Sealed this

Third Day of March, 1992

Attest:

HARRY F. MANBECK, JR.

Attesting Officer

Commissioner of Patents and Trademarks